US008791909B2

(12) United States Patent
Tsai et al.

(10) Patent No.: US 8,791,909 B2
(45) Date of Patent: Jul. 29, 2014

(54) DISPLAY PANEL

(75) Inventors: Yao-Chou Tsai, Hsinchu (TW);
Sung-Hui Huang, Hsinchu (TW);
Po-Wen Hsiao, Hsinchu (TW);
Ted-Hong Shinn, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 432 days.

(21) Appl. No.: 12/853,926

(22) Filed: Aug. 10, 2010

(65) Prior Publication Data

US 2011/0242014 A1    Oct. 6, 2011

(30) Foreign Application Priority Data

Apr. 2, 2010    (TW) ................................ 99110350 A

(51) Int. Cl.
*G06F 3/041*    (2006.01)
*G06F 3/043*    (2006.01)

(52) U.S. Cl.
USPC .......................................... 345/173; 345/177

(58) Field of Classification Search
USPC .................................................. 345/173–178
See application file for complete search history.

(56) References Cited

U.S. PATENT DOCUMENTS

| 7,126,583 | B1* | 10/2006 | Breed ............................ 345/158 |
| 7,433,179 | B2* | 10/2008 | Hisano et al. ............. 361/679.27 |
| 8,144,453 | B2* | 3/2012 | Brown et al. .............. 361/679.21 |
| 2004/0130442 | A1* | 7/2004 | Breed et al. .................... 340/443 |
| 2004/0233174 | A1* | 11/2004 | Robrecht et al. .............. 345/173 |
| 2005/0179668 | A1* | 8/2005 | Edwards ........................ 345/173 |
| 2006/0146035 | A1* | 7/2006 | Cha et al. ....................... 345/173 |
| 2006/0244733 | A1* | 11/2006 | Geaghan ........................ 345/173 |
| 2007/0129100 | A1* | 6/2007 | Kim ............................ 455/550.1 |
| 2008/0055519 | A1* | 3/2008 | Battersby et al. ............... 349/68 |
| 2008/0100590 | A1* | 5/2008 | Hur et al. ....................... 345/173 |
| 2008/0165158 | A1* | 7/2008 | Hotelling et al. ............. 345/174 |
| 2008/0180399 | A1* | 7/2008 | Cheng ........................... 345/173 |
| 2008/0271933 | A1* | 11/2008 | Morimoto ................... 178/18.05 |
| 2008/0289887 | A1* | 11/2008 | Flint et al. ................... 178/18.03 |
| 2009/0009465 | A1* | 1/2009 | Choi et al. ..................... 345/107 |
| 2009/0289910 | A1* | 11/2009 | Hattori ......................... 345/173 |

(Continued)

FOREIGN PATENT DOCUMENTS

| TW | 200919285 A | 5/2009 |
| TW | 200945155 A | 11/2009 |

OTHER PUBLICATIONS

Intellectual Property Office, Ministry of Economic Affairs, R.O.C., "Office Action", Jan. 7, 2014, Taiwan.

*Primary Examiner* — Dwayne Bost
*Assistant Examiner* — Scott Trandai
(74) *Attorney, Agent, or Firm* — Tim Tingkang Xia, Esq.; Morris, Manning & Martin, LLP

(57) ABSTRACT

A display panel is provided. The display panel comprises a first substrate, a second substrate, a display control circuit and a force sensing circuit. The display control circuit is disposed on the first substrate between the first substrate and the second substrate for controlling the display panel to display an image through the second substrate. The force sensing circuit is disposed side by side with the display control circuit on the first substrate between the first substrate and second substrate, wherein the force sensing circuit comprises a plurality of force sensing elements for sensing at least one external force and correspondingly generate a plurality of force signals respectively to transform at least one touch signal corresponding to the at least one external force.

14 Claims, 5 Drawing Sheets

(56) References Cited

U.S. PATENT DOCUMENTS

| | | | |
|---|---|---|---|
| 2010/0001973 A1* | 1/2010 | Hotelling et al. | 345/174 |
| 2010/0050787 A1* | 3/2010 | Abert et al. | 73/862.626 |
| 2010/0053854 A1* | 3/2010 | Nishikawa et al. | 361/679.01 |
| 2010/0090973 A1* | 4/2010 | Algreatly | 345/173 |
| 2010/0103640 A1* | 4/2010 | Brown et al. | 361/829 |
| 2010/0117980 A1* | 5/2010 | Lee et al. | 345/173 |
| 2010/0123686 A1* | 5/2010 | Klinghult et al. | 345/178 |
| 2010/0177057 A1* | 7/2010 | Flint et al. | 345/174 |
| 2010/0225609 A1* | 9/2010 | Huang et al. | 345/173 |
| 2010/0315362 A1* | 12/2010 | Cheng et al. | 345/173 |
| 2011/0026202 A1* | 2/2011 | Kai et al. | 361/679.01 |
| 2011/0050586 A1* | 3/2011 | Miller et al. | 345/173 |
| 2011/0050642 A1* | 3/2011 | Lee et al. | 345/175 |
| 2011/0057904 A1* | 3/2011 | Yamano | 345/174 |
| 2011/0084912 A1* | 4/2011 | Almalki | 345/173 |
| 2011/0141052 A1* | 6/2011 | Bernstein et al. | 345/174 |
| 2011/0187674 A1* | 8/2011 | Baker et al. | 345/174 |
| 2011/0228188 A1* | 9/2011 | Kim et al. | 349/43 |
| 2011/0242014 A1* | 10/2011 | Tsai et al. | 345/173 |
| 2012/0026110 A1* | 2/2012 | Yamano | 345/173 |
| 2012/0169645 A1* | 7/2012 | Chuang et al. | 345/173 |
| 2012/0183271 A1* | 7/2012 | Forutanpour et al. | 386/224 |

\* cited by examiner

DISPLAY PANEL

CROSS-REFERENCES TO RELATED APPLICATIONS

This non-provisional application claims priority under 35 U.S.C. §119(a) on Patent Application No(s). 099110350 filed in Taiwan, R.O.C. on Apr. 2, 2010, the entire contents of which are hereby incorporated by reference.

BACKGROUND OF THE INVENTION

1. Field of the Invention

The present invention relates to a display panel; and more particularly, the present invention relates to a display panel capable of sensing at least one external force.

2. Descriptions of the Related Art

Touch display panels have been used in a variety of products, such as smart phones, notebook computers, e-books and the like, because the panels not only display information but also allow for input via an intuitive manner. For this reason, touch display panels have evolved towards a lighter weight and thinness to reduce both the weight and space occupation thereof.

Generally, touch display panels are categorized into categories including resistive touch display panels, capacitive touch display panels, infrared-ray touch display panels, force-sensing touch display panels, etc. For example, in resistive touch display panels and capacitive touch display panels, a transparent touch panel must be disposed above the display panel so that an image generated by the display panel can be transmitted through the touch panel above. However, a touch panel superposed on the display panel not only increases the overall thickness and visible overall weight of the touch display panel, but also absorbs the light, thereby degrades the light transmittance and eluminance of the image.

On the other hand, for a conventional force-sensing touch display panel, in addition to a display panel, at least four force sensing elements are additionally disposed at the four corners of the display panel. FIG. 1 illustrates a schematic perspective view of a conventional touch display panel. The touch display panel 1 comprises a back cover 11, a display panel 13, a front frame 15 and four force sensors 12a, 12b, 12c, 12d. The display panel 13 is disposed between the back cover 11 and the front frame 15. The force sensors 12a, 12b, 12c, 12d are disposed below the display panel 13 and arranged opposite each other at the four corners respectively to form a sensing area. When the display surface 131 of the display panel 13 is touched, the force sensors 12a, 12b, 12c, 12d can, through calculation, generate a touch signal and process the touch signal correspondingly to accomplish the touch input function. However, a touch display panel that adopts the aforesaid arrangement of the force sensors only has a single-point touch function, thereby limiting the sensing accuracy thereof due to the insufficient amount of sensors.

Furthermore, for the conventional force-sensing touch display panel 1, the display panel 13 thereof is generally suspended by a thread or clamped by a clamp to form a space for accommodating the force sensors 12a, 12b, 12c, 12d between the display panel 13 and the back cover 11. The space increases the thickness of the touch display panel 1 as a whole. Moreover, with this conventional practice, a friction force will also be generated on the sidewall of the panel, and then affect the sensing accuracy.

Accordingly, there is still a need to provide a touch display panel which does not require both the additional use of the touch panel on the display panel, which causes degradation in optical transmittance and an additional suspension device for attaching the display panel. The display panel should provide a multi-point touch function without increasing the weight and the thickness of the touch display panel as a whole.

SUMMARY OF THE INVENTION

The primary objective of the present invention is to provide a display panel with a touch function that is lightweight, thin, and does not degrade the optical transmittance of the display panel.

To achieve the aforesaid objective, the present invention provides a display panel comprising a first substrate, a second substrate, a display control circuit and a force sensing circuit. The display control circuit is disposed on the first substrate between the first substrate and the second substrate and configured to control the display panel to display an image through the second substrate. The force sensing circuit is disposed side by side with the display control circuit on the first substrate between the first substrate and the second substrate. The force sensing circuit comprises a plurality of force sensing elements configured to sense at least one external force and correspondingly generate a plurality of force signals respectively to transform the force signals into at least one touch signal corresponding to the at least one external force.

Accordingly, the display panel features of the present invention are lightweight and thin. By using of a plurality of force sensing elements between the first substrate and the second substrate, a plurality of force signals can be transformed into at least one touch signal corresponding to the at least one external force. Thereby, the sensing accuracy is effectively improved and the multi-point touch function is achieved without compromising the optical transmittance of the display panel, thus overcoming shortcomings of the conventional touch display panel.

DESCRIPTION OF THE PREFERRED EMBODIMENT

In the following description, the present invention will be explained with reference to embodiments thereof. However, these embodiments are not intended to limit the present invention to any specific environment, applications or particular implementations described in these embodiments. Therefore, the descriptions of these embodiments are only used for illustration rather than limitation. It should be appreciated that in the following embodiments and the attached drawings, elements unrelated to the present invention are omitted from depiction. The dimensional relationships among individual elements in the attached drawings are illustrated only for the ease of understanding, but not to limit the actual scale.

Figure 1:
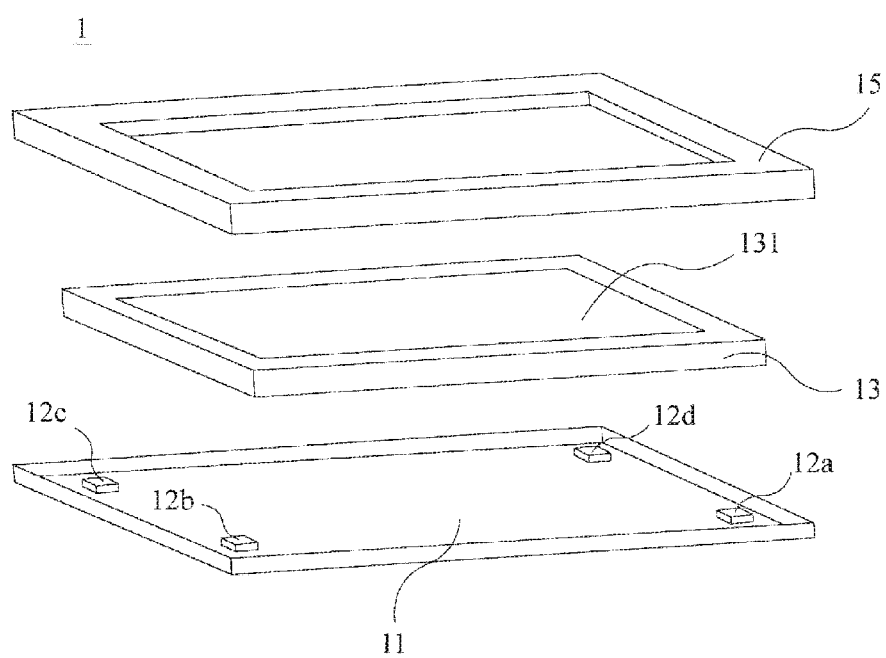
FIG. 1 illustrates a schematic perspective view of a conventional force-sensing touch display panel.
Figure 2:
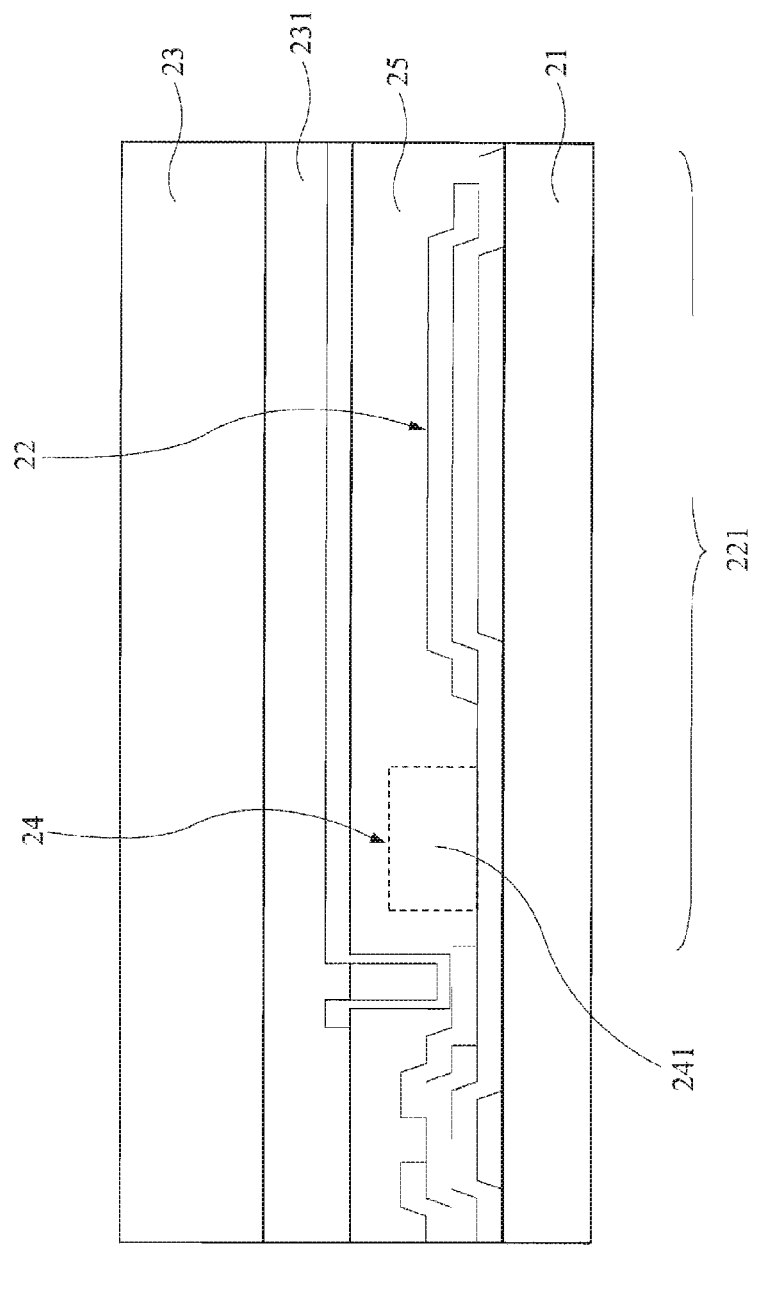
FIG. 2 illustrates a cross-sectional view of a single pixel of a display panel of the present invention.
Figure 3:
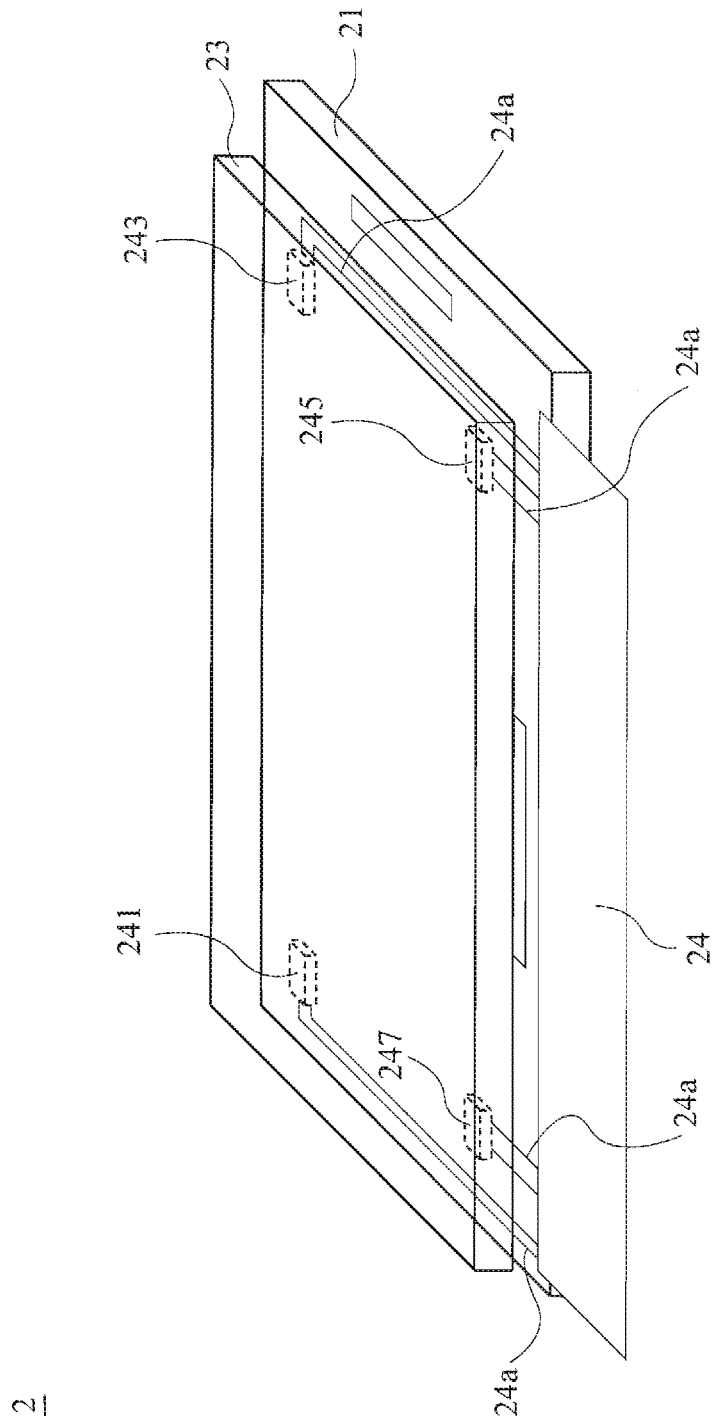
FIG. 3 illustrates a schematic perspective view of the display panel of the present invention.

The preferred embodiment of the present invention is as shown in FIG. 2 and FIG. 3. The display panel 2 comprises a first substrate 21, a second substrate 23, a display control circuit 22, and a force sensing circuit 24. The display control circuit 22 is disposed and formed on the first substrate 21 between the first substrate 21 and the second substrate 23. The display panel 2 may define a pixel region 221, and control the display unit 231 through the display control circuit 22 to form an image. Then, the image is displayed to the outside through the second substrate 23 so that the image presented by the display unit 231 can be viewed by a user through the second substrate 23. As shown in FIG. 2, the force sensing circuit 24 is disposed and formed side by side with the display control circuit 22 on the first substrate 21 between the first substrate 21 and the second substrate 23. As shown in FIG. 3, the force sensing circuit 24 at least comprises a plurality of force sensing elements 241, 243, 245, 247, which is configured to sense at least one external force and correspondingly generate a plurality of force signals respectively to transform the force signals into at least one touch signal corresponding to the at least one external force.

For one example, the display panel 2 may be a liquid crystal display (LCD) panel, which comprises a liquid crystal layer serving as the display unit 231 and disposed between the first substrate 21 and the second substrate 23. In this example, the display panel 2 may be a transmissive LCD panel or a reflective LCD panel. Furthermore, in another example, the display panel 2 may also be an e-paper panel, which comprises a graphic display layer serving as the display unit 231 that is disposed between the first substrate 21 and the second substrate 23. In this example, the display panel 2 may be one of the following: an electrophoretic display (EPD) panel, a quick response liquid powder display (QR-LPD) panel, an electrowetting display panel and a Cholesteric LCD (Ch-LCD) panel.

The display panel 2 of the present invention further comprises a passivation layer 25 disposed between the first substrate 21 and the second substrate 23 and between the display unit 231 and the first substrate 21. Both the display control circuit 22 and the force sensing circuit 24 are covered by the passivation layer 25 so that the display control circuit 22 and the force sensing circuit 24 can be protected by the passivation layer 25. Furthermore, the passivation layer 25 also has a function of transferring the at least one external force to the force sensing elements 241, 243, 245, 247.

To describe the structure of the force sensing circuit 24 more clearly, FIG. 3 illustrates a schematic perspective view of the display panel 2. For purpose of clarity, such elements as the display control circuit 22 and the passivation layer 25, etc. are omitted from FIG. 3. The force sensing circuit 24, which comprises a plurality of electrically conductive metal patterns 24a, is electrically connected to the force sensing elements 241, 243, 245, 247, and disposed and formed collectively on the first substrate 21. In one example, the force sensing elements 241, 243, 245, 247 are disposed opposite each other at the four corners respectively of the first substrate 21 to form a sensing area. When the sensing area is pressed by an external force, the force sensing elements 241, 243, 245, 247 correspondingly generate a plurality of force signals respectively. Through the processing of the sensing circuit 24, the force signals are transformed into a touch position signal to determine the position of the external force.

In this embodiment, the force sensing elements 241, 243, 245, 247 may be made of one of a pressure sensitive and electrically conductive material and a piezoelectric material. The pressure sensitive and electrically conductive material may be selected from a group consisting of the following: ethylene-propylene-diene monomer (EPDM) rubber, nitrile butadiene rubber (NBR), neoprene, silicone rubber and combinations thereof. The material may be doped with electrically conductive particles. The piezoelectric material may be selected from a group consisting of $BaTiO_3$, lead zirconate titanate (PZT), AlN and combinations thereof. However, the materials described above are only provided as examples for this embodiment, and the present invention is not merely limited thereto.

The first substrate 21 of the present invention may be one of a hard substrate and a flexible substrate. The hard substrate may be made of a material selected from a group consisting of glass and metal materials. The flexible substrate may be made of a material selected from a group consisting of polyimide (PI), polyethylene terephthalate, polyethylene naphthalate, aromatic polyamide, cycloolefin polymer, polysulfone, epoxy, polycarbonate, polymethyl methacrylate and combinations thereof. The materials described above are only provided as an example in this embodiment, and the present invention is not merely limited thereto.

Figure 4A:
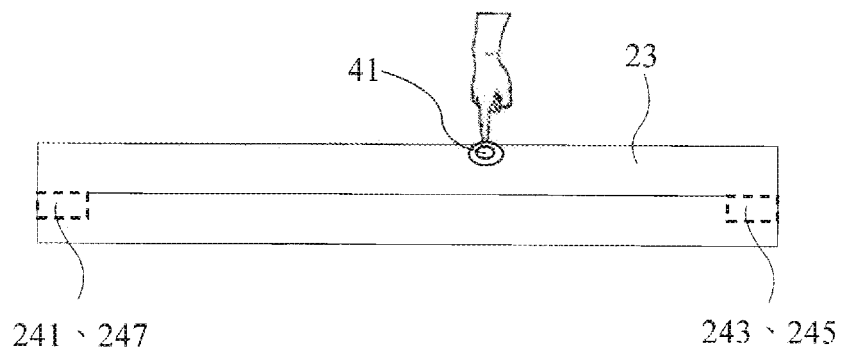
FIG. 4A illustrates a side view of a display panel with a single-point touch sensing function according to the present invention.
Figure 4B:
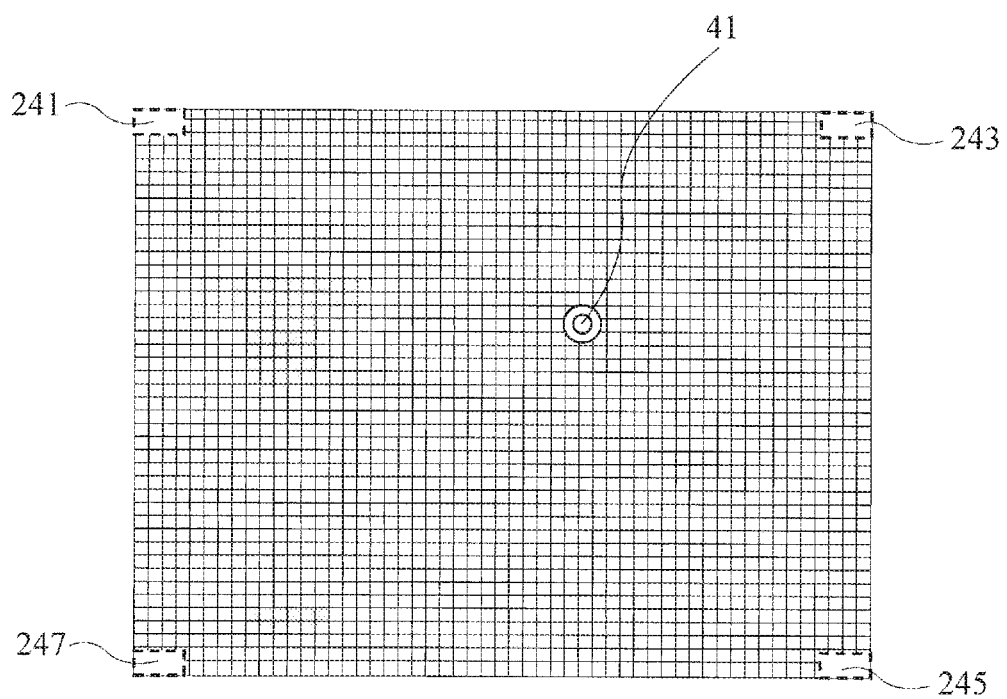
FIG. 4B illustrates a top view of the display panel with the single-point touch sensing function according to the present invention.

Hereinafter, the principle of sensing and positioning an external force in the display panel 2 having a single-point touch sensing function according to an embodiment of the present invention will be further described. Referring to FIG. 4A and FIG. 4B, the force sensing elements 241, 243, 245, 247 located at four corners of the second substrate 23 form a sensing area. When an external force touches the second substrate 23 at a touch position 41 in the sensing area, the external force is received by the force sensing elements 241, 243, 245, 247 through the second substrate 23 and the passivation layer 25 and then transformed by the force sensing elements 241, 243, 245, 247 respectively into force signals, which are then calculated to generate a touch signal.

Figure 5A:
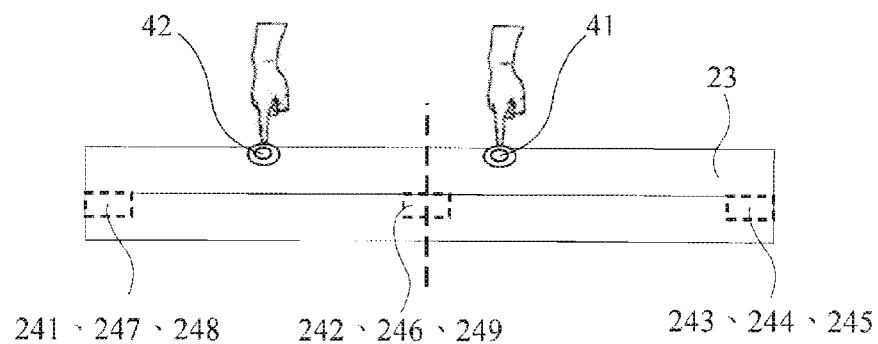
FIG. 5A illustrates a side view of a display panel with a multi-point touch sensing function according to the present invention.
Figure 5B:
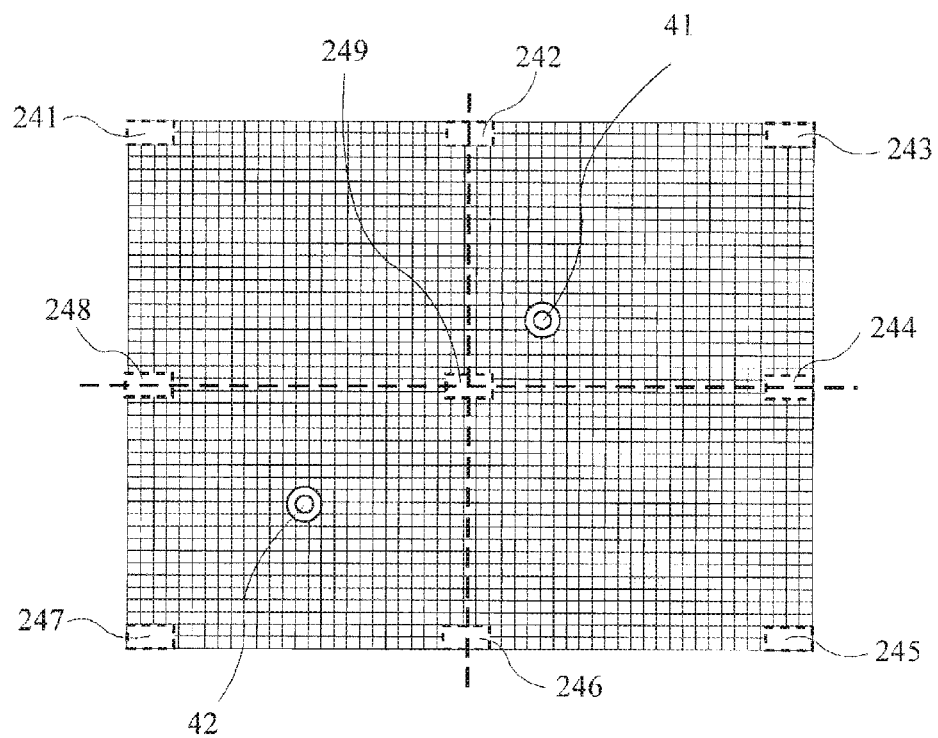
FIG. 5B illustrates a top view of the display panel with the multi-point touch sensing function according to the present invention.

Hereinafter, the principle of sensing and positioning external forces in the display panel 2 with a multi-point touch sensing function according to another embodiment of the present invention will be further described. In reference to FIGS. 5A and 5B, force sensing elements 242, 244, 246, 248, 249 are additionally disposed between the force sensing elements 241, 243, 245, 247 as shown in FIGS. 4A and 4B to form four sensing areas to achieve the multi-point touch function. When an external force touches the second substrate 23 at the touch position 41, the external force is received by the force sensing elements 242, 243, 244, 249 through the second substrate 23 and the passivation layer 25, and then transformed by the force sensing elements 242, 243, 244, 249 respectively into force signals, which are then calculated to generate a touch signal to indicate that the touch position 41 is touched. When another external force touches the second substrate 23 at a touch position 42, another external force is received by the force sensing elements 246, 247, 248, 249 through the second substrate 23 and the passivation layer 25, and then transformed by the force sensing elements 246, 247, 248, 249 respectively into force signals, which are then calculated to generate another touch signal to indicate that the touch position 42 is touched.

As can be known from the above description, the display panel 2 can effectively improve the accuracy of multi-point touch sensing by increasing the amount and the density of the force sensing elements. In the display panel 2, a force sensing element may be disposed in each of the pixels respectively to improve the sensing accuracy considerably. Furthermore, the display panel 2 may be formed by forming the display control circuit 22 and the force sensing circuit 24 on the first substrate 21 simultaneously through a semiconductor manufacturing process. A force sensing element may also be formed in each of the pixels correspondingly when the pixels are formed.

In summary, the present invention provides a display panel that is unlike conventional force-sensing touch display panels. The display panel of the present invention has force sensing elements that are integrally embedded into the display panel to eliminate the need of a ponderous suspension device which would otherwise increase the weight and the thickness of the display panel as a whole. Furthermore, the display panel of the present invention can also eliminate the use of an additional touch panel, which would compromise the optical transmittance, on the display panel to achieve the touch function.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A display panel, comprising:
    a first substrate;
    a second substrate;
    a display control circuit, disposed on the first substrate between the first substrate and the second substrate, being configured to control the display panel to display an image through the second substrate;
    a force sensing circuit, disposed side by side with the display control circuit on the first substrate between the first substrate and the second substrate, wherein the force sensing circuit comprises a plurality of force sensing elements configured to sense at least one external force and correspondingly generate a plurality of force signals respectively to transform the force signals into at least one touch signal corresponding to the at least one external force; and
    a passivation layer, disposed between the first substrate and the second substrate, that is directly adjacent to and overlapping the display control circuit and the force sensing circuit to protect both circuits and transfer the at least one external force to the plurality of force sensing elements.

2. The display panel as claimed in claim 1, wherein the display panel comprises a plurality of pixels, and each of the force sensing elements is disposed in a corresponding one of the pixels.

3. The display panel as claimed in claim 1, wherein the display panel is a liquid crystal display (LCD) panel comprising a liquid crystal layer disposed between the first substrate and the second substrate.

4. The display panel as claimed in claim 3, wherein the LCD panel is one of a transmissive LCD panel and a reflective LCD panel.

5. The display panel as claimed in claim 1, wherein the display panel is an e-paper panel comprising a graphic display layer disposed between the first substrate and the second substrate.

6. The display panel as claimed in claim 5, wherein the e-paper panel is one of an electrophoretic display (EPD) panel, a quick response liquid powder display (QR-LPD) panel, an electrowetting display panel and a Cholesteric LCD (Ch-LCD) panel.

7. The display panel as claimed in claim 1, wherein the force sensing elements comprises a pressure sensitive and electrically conductive material.

8. The display panel as claimed in claim 7, wherein the pressure sensitive and electrically conductive material is selected from a group consisting of ethylene-propylene-diene monomer (EPDM) rubber, nitrile butadiene rubber (NBR), neoprene, silicone rubber and combinations thereof.

9. The display panel as claimed in claim 1, wherein the force sensing elements comprises a piezoelectric material.

10. The display panel as claimed in claim 9, wherein the piezoelectric material is selected from a group consisting of $BaTiO_3$, lead zirconate titanate (PZT), AN and combinations thereof.

11. The display panel as claimed in claim 1, wherein the first substrate is a hard substrate.

12. The display panel as claimed in claim 11, wherein the hard substrate is made of a material selected from a group consisting of glass and metal materials.

13. The display panel as claimed in claim 1, wherein the first substrate is a flexible substrate.

14. The display panel as claimed in claim 13, wherein the flexible substrate is made of a material selected from a group consisting of polyimide (PI), polyethylene terephthalate, polyethylene naphthalate, aromatic polyamide, cycloolefin polymer, polysulfone, epoxy, polycarbonate, polymethyl methacrylate and combinations.

* * * * *